July 2, 1940. A. G. ZIMMERMAN 2,206,380
SOUND HEAD
Filed June 18, 1938 2 Sheets-Sheet 1
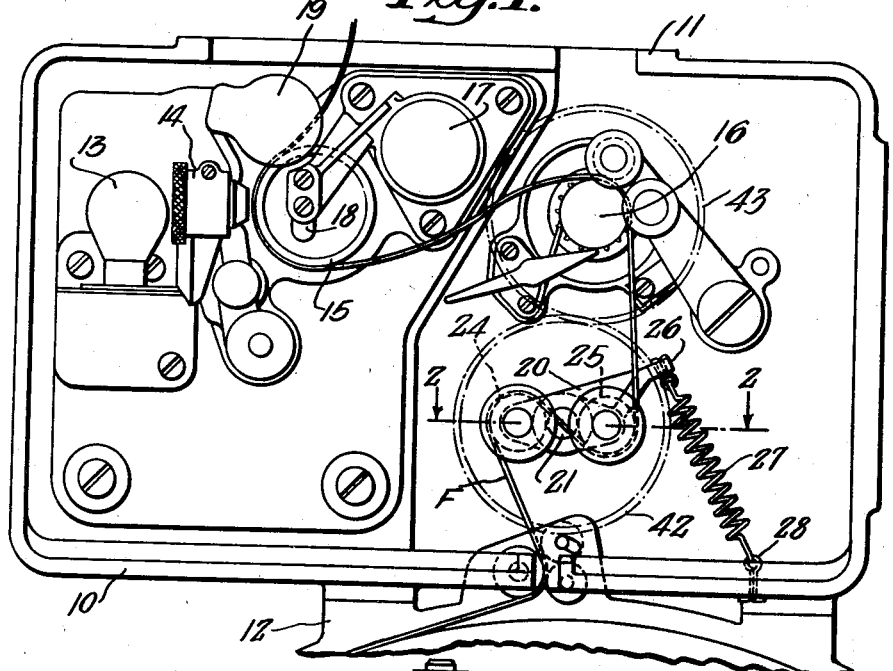
Fig.1.
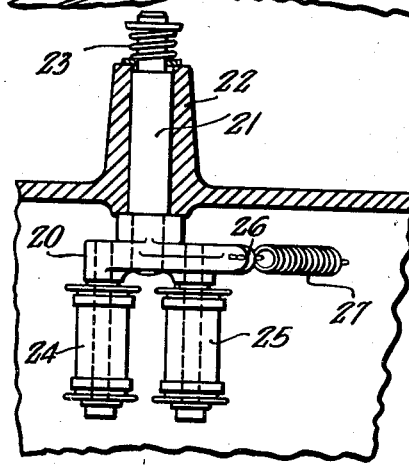
Fig.2.
INVENTOR
Arthur G. Zimmerman
BY
ATTORNEY July 2, 1940.  A. G. ZIMMERMAN  2,206,380
SOUND HEAD
Filed June 18, 1938  2 Sheets-Sheet 2

Inventor
Arthur G. Zimmerman
By J. Huff
Attorney

Patented July 2, 1940

2,206,380

UNITED STATES PATENT OFFICE 2,206,380

SOUNDHEAD

Arthur G. Zimmerman, Indianapolis, Ind., assignor to Radio Corporation of America, a corporation of Delaware Application June 18, 1938, Serial No. 214,508

1 Claim. (Cl. 179—100.3)

This invention relates to an improved soundhead for photoelectrically reproducing sound from sound picture film, and is an improvement upon the apparatus described and claimed in Robinson application Serial No. 203,720, filed April 23, 1938 and upon the construction described and claimed in Reynolds Patent 2,013,109 and Loomis, et al. Patent 2,019,147.

The invention pertains to an improved spring idler arrangement which is inserted between the constant speed sprocket and the take-up mechanism for absorbing jerks in the film tending to be imparted to the constant speed sprocket from the take-up reel.

The invention is an improvement over that of Robinson in that I provide damping means on the spring idler and I further provide an interchangeable mechanism wherein the spring idler may be, if desired, used to control the take-up reel or a hold-back sprocket may be substituted for the idler. These results are accomplished by mounting the idler in a long boss which permits oscillations of the idler to be damped by lubricating oil, and this boss further serves as a bearing for the control pulley if it is desired to control the take-up reel from the idler or for a bearing if it is desired to use a hold-back sprocket in place of the idler.

One object of the invention is to provide an improved film take-up mechanism.

Another object of the invention is to provide an improved means for absorbing jerks in the film between the take-up mechanism and the sound reproduction point.

Another object of the invention is to provide an improved type of spring idler.

Another object of the invention is to provide an elasitance in the film path, the tension upon which varies more nearly direct with the deflection thereof than has heretofore been the case.

Another object of the invention is to provide an improved control mechanism for the take-up reel drive.

Another object of the invention is to provide a soundhead in which a hold-back sprocket may be used, if desired, instead of the double idler.

Figure 3:
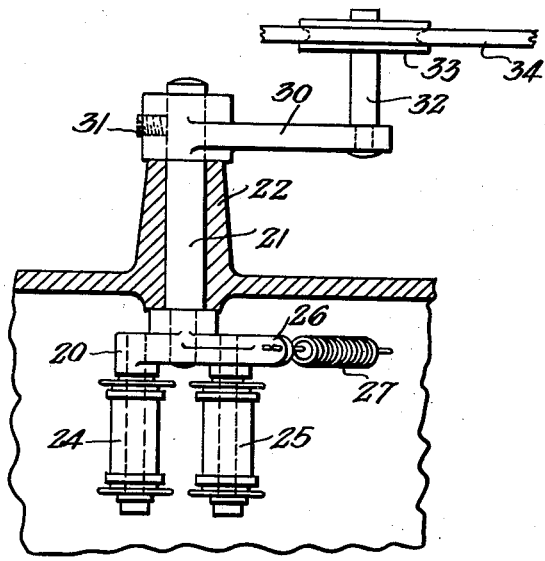
Figure 4:
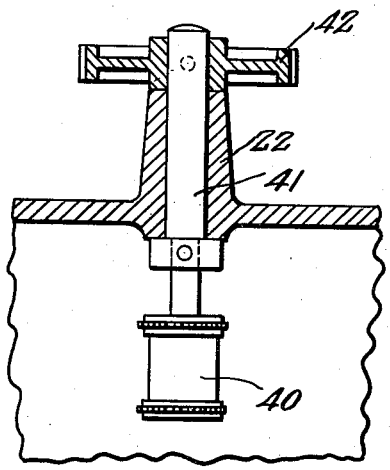

Other and incidental objects of the invention will be apparent to those skilled in the art from a reading of the following specification and an inspection of the accompanying drawings, in which Figure 1 is a side view of my improved soundhead, Figure 2 is a section on the line 2—2 of Fig. 1, Figure 3 is a section corresponding to Fig. 2 showing the take-up control idler connected to the film idler, and Figure 4 is a section corresponding to Fig. 2 but showing the hold-back sprocket substituted for the idler.

Referring first to Fig. 1, the usual casing 10 is provided, which is adapted to support a motion picture projector on its upper surface 11, and to the bottom of which the usual type of film take-up magazine 12 is adapted to be secured. Within this soundhead there is provided an exciter lamp 13, an optical system 14 for directing a fine line of light from the exciter lamp upon the film, a film drum 15 provided with a viscous damper as in the aforesaid Reynolds and Loomis, et al. patents, and a film-pulling sprocket 16, likewise as in the aforesaid Reynolds and Loomis, et al. patents. An appropriate photocell housing 17 is provided into which light passing through the film is directed by an appropriate prismatic lens located at 18. The film is maintained in contact with the drum 15 by an appropriate pressure roller 19.

In the aforesaid Loomis, et al. patent, the film passes from the sprocket corresponding to 16 in Fig. 1 through a free member to a second sprocket, the first sprocket serving to pull the film at a uniform speed over the drum at the reproduction point, and the second sprocket serving to hold back the film and feed it to the take-up reel, thereby preventing any jerks due to faulty operation of the take-up drive or to any other inequalities in the take-up from being transmitted back to the sprocket which draws the film around the drum at the reproduction point.

In the aforesaid Robinson application the second sprocket of the Loomis, et al. patent was eliminated and the double idler assembly shown in detail in Fig. 2 was substituted therefor. The idler according to my invention, although shown in the identical manner in which it was shown in the Robinson application, differs therefrom in that Robinson proposed the double idler 24 and 25 carried by the yoke 20, while I have added to that construction the shaft 21 and the spring 23 which bears upon the boss 22, this lengthened shaft 21 providing a long bearing in the boss 22 which, when lubricated by oil of appropriate consistency, adequately damps any movements of the double idler and yoke, which damping means was not originally provided by Robinson.

To describe the idler assembly in more detail: This idler assembly consists of a supporting member 20 carried on a shaft 21 mounted in an appropriate bearing 22 in the soundhead and held snugly therein by the spring 23. The member 20 carries two idler rollers 24 and 25, which are spaced at equal distances from the axis of the shaft 21. The member 20 is extended as indicated at 26 to permit the attachment of the spring 27, which is secured to the casing of the soundhead, as indicated at 28. This spring 27 pulls the idler in a clockwise direction, and when no film is in the device the line connecting the axes of the two idler pulleys 24 and 25 is tilted clockwise at an angle of about 30° from the horizontal. When film F is threaded into the soundhead, it follows the path shown in Fig. 1, passing under the idler 25 and over the idler 24, thereby doubling the pull applied to the spring 27 as compared to the effect of a single idler. When the apparatus is running and film is being taken up in the take-up magazine 12, the idlers assume approximately the position shown in Fig. 1 and a slight irregularity in the drive of the take-up mechanism causes them to rotate clockwise or counterclockwise with the shaft 21.

Due to the use of two idlers with a single spring, this idler arrangement is very compact, the amount of film which can be taken up by a given movement of the idler is very greatly increased as compared with a single spring idler pressed laterally against the film, and the tension of the film increases more nearly arithmetically with the deflection than is the case with a single spring idler, where the tension increases exponentially.

As pointed out above, the foregoing arrangement permits the omission of the usual let-off sprocket and still secures satisfactory operation of the soundhead without jerks of the take-up mechanism being too seriously transmitted to the film at the reproduction point on the drum 15.

The arrangement shown in Fig. 3 differs from that shown in Fig. 2 in that the arm 30 is fixed to the shaft 21 by an appropriate set screw 31. This arm 30 carries on its outer end a shaft 32 which, in turn, carries a pulley 33. The pulley 33 is adapted to bear against the belt 34, which is the usual belt running from the soundhead to the spindle of the take-up reel and serving to drive the latter. It will be apparent from a comparison of Fig. 3 and Fig. 1 that when the film F is pulled too tightly by the take-up reel the double idlers 24 and 25 will be rotated in a counterclockwise direction with the shaft 21 and will thereby raise the pulley 33, decreasing the tension on the take-up drive belt 34 and correspondingly decreasing the tension upon the film F, thereby automatically maintaining the take-up of the film F at a uniform tension.

In the modification of the invention shown in Fig. 4 a hold-back sprocket 40, similar to the sprocket 16, is substituted for the double idlers, being carried upon an appropriate shaft 41 which, in turn, carries a gear 42 on its other end. This gear 42 is the same size as and is adapted to engage a similar gear 43 upon the shaft of the constant speed sprocket 16 and the hold-back sprocket 40 is thereby driven in a direction opposite to the sprocket 16, the film being threaded over these two sprockets with a free loop therebetween. The hold-back sprocket 40 thereby functions to prevent any jerks in the film from being transmitted to the film on the constant speed sprocket 16, as in the aforesaid Loomis et al. patent.

I claim as my invention:

Apparatus of the class described including sound reproducing means, a constant speed sprocket for drawing film past said reproducing means, film take-up means, a spring idler between said constant speed sprocket and said take-up means, said spring idler including two idler rollers similarly revoluble about a common axis and being provided with a long shaft, and a long bearing supporting said shaft whereby lubricant between said shaft and said bearing will provide viscous damping for said spring idler.

ARTHUR G. ZIMMERMAN.